US007468199B2

(12) United States Patent
Divigalpitiya et al.

(10) Patent No.: US 7,468,199 B2
(45) Date of Patent: Dec. 23, 2008

(54) ADHESIVE MEMBRANE FOR FORCE SWITCHES AND SENSORS

(75) Inventors: Ranjith Divigalpitiya, London (CA); Pei-Jung Chen, London (CA); David A. Kanno, London (CA); Gabriella Miholics, London (CA); Vijay Patel, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 68 days.

(21) Appl. No.: 11/021,913

(22) Filed: Dec. 23, 2004

(65) Prior Publication Data

US 2006/0141192 A1 Jun. 29, 2006

(51) Int. Cl.

| | |
|---|---|
| ***B32B 9/00*** | (2006.01) |
| ***B32B 33/00*** | (2006.01) |
| ***B32B 7/12*** | (2006.01) |
| ***H01H 1/02*** | (2006.01) |

(52) U.S. Cl. .................... 428/40.1; 428/40.2; 428/40.4; 428/40.9; 428/42.1; 428/343; 200/511; 200/512

(58) Field of Classification Search ................ 428/40.1, 428/40.2, 40.4, 40.9, 42.1, 357, 378, 323, 428/343; 200/512, 511

See application file for complete search history.

(56) References Cited

U.S. PATENT DOCUMENTS

| | | | |
|---|---|---|---|
| 3,475,213 | A | 10/1969 | Stow |
| 3,699,294 | A | 10/1972 | Sudduth |
| 3,879,618 | A | 4/1975 | Larson |
| 4,098,945 | A | 7/1978 | Oehmke |
| 4,164,634 | A | 8/1979 | Gilano |
| 4,307,275 | A | 12/1981 | Larson et al. |
| 4,317,013 | A | 2/1982 | Larson |
| 4,385,215 | A | 5/1983 | Lemberg |
| 4,421,958 | A | 12/1983 | Kameda |
| 4,575,580 | A | 3/1986 | Jandrell |
| RE32,180 | E | 6/1986 | Lewiner et al. |
| 4,644,101 | A | 2/1987 | Jin et al. |
| 4,775,765 | A | 10/1988 | Kimura et al. |

(Continued)

FOREIGN PATENT DOCUMENTS

DE 41 14 701 A1 11/1992

(Continued)

OTHER PUBLICATIONS

Fulton et al., Electrical and Mechanical Properties of a Metal-Filled Polymer Composite for Interconnection and Testing Applications, AT&T Bell Laboratories, 0569-5503/89/0071.

*Primary Examiner*—Patricia L Nordmeyer

(57) ABSTRACT

An adhesive membrane comprises (a) a conductor; (b) a composite material comprising conductive particles at least partially embedded in an electrically insulating layer disposed on the conductor; and (c) a pressure sensitive adhesive layer disposed on the composite material, the conductive particles being capable of electrically connecting the conductor to a second conductor under application of sufficient pressure therebetween, the conductive particles having no relative orientation and being disposed so that substantially all electrical connections made between the conductor and a second conductor will be in the z direction, and the combined thickness of the electrically insulating layer and the pressure sensitive adhesive layer being greater than the size of the largest conductive particle when the largest conductive particle is measured in the z direction.

23 Claims, 2 Drawing Sheets

U.S. PATENT DOCUMENTS

| | | | |
|---|---|---|---|
| 4,801,771 | A | 1/1989 | Mizuguchi et al. |
| 4,829,349 | A | 5/1989 | Luryi |
| 4,914,416 | A | 4/1990 | Kunikane |
| 4,963,417 | A | 10/1990 | Taniguchi et al. |
| 5,209,967 | A | 5/1993 | Wright et al. |
| 5,243,162 | A | 9/1993 | Kobayashi |
| 5,296,837 | A | 3/1994 | Yaniger |
| 5,302,936 | A | 4/1994 | Yaniger |
| 5,371,327 | A | 12/1994 | Fujinami et al. |
| 5,593,395 | A | 1/1997 | Martz |
| 5,898,426 | A | 4/1999 | Kim |
| 5,925,001 | A | 7/1999 | Hoyt et al. |
| 5,986,223 | A | 11/1999 | Kim |
| 5,995,198 | A | 11/1999 | Mizutani |
| 5,997,996 | A | 12/1999 | Tamura |
| 6,073,497 | A | 6/2000 | Jiang et al. |
| 6,078,274 | A | 6/2000 | Inou |
| 6,088,024 | A | 7/2000 | Yamagata |
| 6,114,645 | A | 9/2000 | Burgess |
| 6,118,435 | A | 9/2000 | Fujita et al. |
| 6,121,869 | A | 9/2000 | Burgess |
| 6,287,253 | B1 | 9/2001 | Ortega et al. |
| 6,296,066 | B1 | 10/2001 | Terry et al. |
| 6,310,614 | B1 | 10/2001 | Maeda et al. |
| 6,369,803 | B2 | 4/2002 | Brisebois et al. |
| 6,441,118 | B2 | 8/2002 | Sherman et al. |
| 6,569,494 | B1 | 5/2003 | Chambers et al. |
| 6,809,280 | B2 | 10/2004 | Divigalpitiya et al. |
| 6,815,874 | B2 | 11/2004 | Hermle et al. |
| 6,832,522 | B2 | 12/2004 | Schaefer et al. |
| 2001/0000915 | A1 | 5/2001 | Katchmar |
| 2002/0119255 | A1 | 8/2002 | Divigalpitiya et al. |
| 2003/0129302 | A1 | 7/2003 | Chambers et al. |
| 2003/0178221 | A1 | 9/2003 | Chiu et al. |
| 2003/0205450 | A1 | 11/2003 | Divigalpitiya et al. |
| 2004/0109096 | A1 * | 6/2004 | Anderson et al. ........... 348/832 |
| 2006/0137462 | A1 | 6/2006 | Divigalpitiya et al. |

FOREIGN PATENT DOCUMENTS

| | | | |
|---|---|---|---|
| EP | 1 172 831 | A2 | 1/2002 |
| GB | 2 049 290 | A | 12/1980 |
| GB | 2 134 322 | A | 8/1984 |
| GB | 2 233 499 | A | 1/1991 |
| JP | 59-188726 | | 10/1984 |
| JP | 60-65406 | | 4/1985 |
| JP | 1-132017 | | 5/1989 |
| JP | 5-143219 | | 6/1993 |
| JP | 7-219697 | | 8/1995 |
| JP | 7-296672 | | 11/1995 |
| JP | 2000-029612 | | 1/2000 |
| JP | 2001-228975 | | 8/2001 |
| WO | WO 00/00563 | | 1/2000 |
| WO | WO 03/094186 | A1 | 11/2003 |

* cited by examiner

ADHESIVE MEMBRANE FOR FORCE SWITCHES AND SENSORS

FIELD

This invention relates to adhesive membranes for force switches and sensors, and to methods of force sensing using the adhesive membranes.

BACKGROUND

Force switches and force sensing membranes are used in various applications to detect contact/touch, detect and measure a relative change in force or applied load, detect and measure the rate of change in force, and/or detect the removal of a force or load.

Force sensing membranes, for example, typically consist of an elastomer comprising conductive particles (the "elastomeric layer") positioned between two conducting contacts. When pressure is applied to one of the conducting contacts, the conducting contact is pressed against the surface of the elastomeric layer, and conduction paths are created. The conduction paths are made up of chains of the conductive particles that make a tortuous path through the elastomer. Therefore, the concentration of conductive particles in the elastomer must be above a certain threshold (that is, above the percolation threshold) to make a continuous path. As pressure is increased, greater numbers and regions of contact between the conducting contact and the elastomeric layer's surface are created. Thus, a greater number of conduction paths through the elastomer and conductive particles are created, and the resistance across the elastomer layer is decreased.

SUMMARY

In view of the foregoing, we recognize that because the conduction paths in force sensing membranes of the prior art are made up of many conductive particle contacts, variations in resistance and hysteresis can result.

In addition, we recognize that providing a fully constructed force switch or sensor to an end user can limit its use. We recognize that in some situations it can be desirable for an end user to customize a force switch or sensor by providing their own conductor or electrode.

Briefly, in one aspect, the present invention provides an adhesive membrane comprising (a) a conductor, (b) a composite material comprising conductive particles at least partially embedded in an electrically insulating layer disposed on the conductor, and (c) a pressure sensitive adhesive layer disposed on the composite material.

The conductive particles are capable of electrically connecting the conductor to a second conductor under application of sufficient pressure therebetween.

The conductive particles have no relative orientation and are disposed so that substantially all electrical connections made between the conductor and a second conductor will be in the z direction (that is, substantially all electrical connections are in the thickness direction of a relatively planar structure, not in the in-plane (x-y) direction).

The combined thickness of the electrically insulating layer and the pressure sensitive adhesive layer is greater than the size of the largest conductive particle when the largest conductive particle is measured in the z direction.

The adhesive membrane of the present invention can be adhered to a conductor of the end user's choice. Therefore, the adhesive membrane of the present invention provides the end user with flexibility in its use. In addition, force sensors comprising the adhesive membranes of the invention meet the need in the art for force sensing membranes with less variation in resistance and hysteresis than those made up of many conductive particle contacts.

Figure 1:
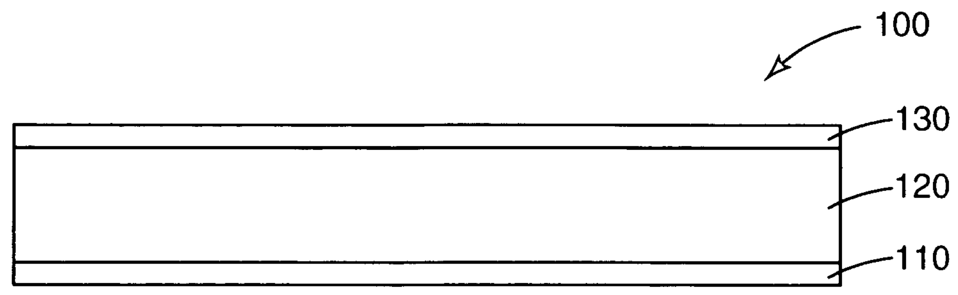
FIG. 1 is a schematic side view of an adhesive membrane.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The adhesive membranes of the invention can be adhered to a second conductor and used in various applications as force switches or sensors to detect contact/touch, detect and measure a relative change in force or applied load, detect and measure the rate of change in force, and/or detect the removal of a force or load.

When sufficient pressure is applied to an adhesive membrane of the present invention adhered to a second conductor, electrical contact is made between the adhesive membrane's conductor and the second conductor. To make electrical contact between the adhesive membrane's conductor and another conductor, the present invention employs conductive particles preferably distributed in such a manner that substantially all electrical contacts are through one or more single particles (that is, both the adhesive membrane's conductor and the other conductor are in simultaneous electrical contact with the same particle or particles). The conductive particles are at least partially embedded in an electrically insulating layer, and a pressure sensitive adhesive (PSA) layer is on top of the electrically insulating layer. By insulating, it is meant that the material is substantially less conductive than the conductor and the conductive particles. As used herein, "insulating" materials or layers have a resistivity greater than about 109 ohms.

The electrically insulating layer and PSA layer allow for the electrical connection made upon application of pressure to be substantially reduced when no pressure is applied.

For example, the electrically insulating layer and the PSA can be a resilient material that can be deformed to allow electrical contact to be made upon the application of pressure, and that returns the conductors to their initial separated positions when no pressure is applied.

Distributing the conductive particles so that electric contacts are made via one or more single particles can have several benefits. Because the adhesive membrane's conductor and another conductor are in electrical contact via single particles, there are at most only two contact points to contribute to contact resistance for each particle contact (a conductive particle contacting the adhesive membrane's conductor is one contact point, and the same conductive particle contracting the other conductor is another contact point), and this number of contact points remains consistent for each activation of a particular force sensing membrane. This can result in a relatively low contact resistance and a more consistent, reliable, and reproducible signal every time the membrane is activated. Lower contact resistance gives rise to less signal loss, which ultimately results in a higher signal to noise ratio, which can result in more accurate positional or pressure determinations in touch or force sensor devices.

Another advantage of single particle electrical contacts is the absence of particle alignment requirements and preferred particle-to-particle orientations. For example, application of a magnetic field during manufacturing is not required to orient and align the particles, making manufacturing easier and less costly. In addition, when magnetic alignment is used, the conductive particles span the entire thickness of the resulting film, requiring another insulating layer to be applied so that the overall construction is not conductive in the absence of pressure. The absence of particle alignment requirements can also improve durability relative to devices that employ aligned wires or elongated rods vertically oriented in the thickness direction of the device that can be subject to bending and breaking upon repeated activation and/or relatively high applied forces. The absence of particle alignment and orientation requirements makes the adhesive membranes of the present invention particularly suitable for applications where the membrane is to be mounted in curved, irregular, or otherwise non-flat configurations.

Adhesive membranes of the present invention can also be made very thin because the composite material and the PSA layer need only be slightly larger than the largest conductive particles. Relatively low particle loadings can be used while still maintaining reliable performance and sufficient resolution. The particles can also be distributed so that the activation force (that is, the force required to activate the adhesive membrane when it is adhered to a conductor) is uniform across the surface of the membrane. The ability to use lower particle density can also be a cost advantage because fewer particles are used.

FIG. 1 shows an adhesive membrane 100 that includes a conductor in the form of a conductive layer 110, a composite material 120 disposed on the conductive layer, and a PSA layer 130 disposed on the composite material. The composite material 120 has conductive particles wholly or partially embedded in an electrically insulating layer.

The conductive layer 110 can be a conductive sheet, foil, or coating. The material of the conductive layer can include any suitable conductive materials such as, for example, metals, semiconductors, doped semiconductors, semi-metals, metal oxides, organic conductors and conductive polymers, and the like, and mixtures thereof. Suitable inorganic materials include, for example, copper, gold, and other metals or metal alloys commonly used in electronic devices, as well as transparent conductive materials such as transparent conductive oxides (for example, indium tin oxide (ITO), antimony tin oxide (ATO), and like). Suitable organic materials include, for example, conductive organic metallic compounds as well as conductive polymers such as polypyrrole, polyaniline, polyacetylene, polythiophene, and materials such as those disclosed in European Patent Publication EP 1172831.

For some applications (for example, healthcare/medical applications) it is preferable that the conductive layer be permeable to moisture vapor. Preferably, the moisture vapor transmission rate (MVTR) of the conductive layer is at least about 400 g water/$m^2$/24 hours (more preferably, at least about 800; even more preferably, at least about 1600; most preferably, at least about 2000) when measured using a water method according to ASTM E-96-00.

The conductor can be self-supporting or can be provided on a substrate (not shown in FIG. 1). Suitable substrates can be rigid (for example, rigid plastics, glass, metals, or semiconductors) or flexible (for example, flexible plastic films, flexible foils, or thin glass. Substrates can be transparent or opaque depending upon the application.

The composite material disposed between the conductor and the PSA layer includes conductive particles at least partially embedded in an electrically insulating layer. The conductive particles are disposed so that when the adhesive membrane is adhered to another conductor and pressure is applied to the device to move one conductor relative to the other (that is, to move the adhesive membrane's conductor toward the other conductor, or vice versa), an electrical connection can be made through single particles contacting both of the conductors.

Exemplary materials for the electrically insulating layer include those materials that can maintain sufficient electrical separation between the conductors when an adhesive membrane of the invention is adhered to a second conductor, and that exhibit deformability and resiliency properties that allow the insulating material to be compressed to allow electrical contact of the conductors via one or more single particle contacts and to return the conductors to an electrically separated state when sufficient pressure is no longer being applied between the conductors. Suitable insulating materials include silicones, polysiloxanes, polyurethane, polysilicone-polyurethanes, rubber, ethylene-vinyl acetate copolymers, phenolic nitrile rubber, styrene butadiene rubber, polyether-block-amides, and polyolefins, and the like.

For some applications (for example, healthcare/medical applications) it is preferable that the electrically insulating layer be permeable to moisture vapor. Preferably, the moisture vapor transmission rate (MVTR) of the elastomeric material is at least about 400 g water/$m^2$/24 hours (more preferably, at least about 800; even more preferably, at least about 1600; most preferably, at least about 2000) when measured using a water method according to ASTM E-96-00.

In some applications, it is also preferable that the electrically insulating layer material is not substantially affected by humidity.

The PSA layer comprises a material that has properties of a PSA (that is, it provides adherence with no more than finger pressure) and an electrically insulating material as described above.

Suitable materials for the PSA layer include, for example, materials that are suitable as insulating materials that have been modified with additives, as is well known in the art, to achieve PSA properties.

Figure 2A:
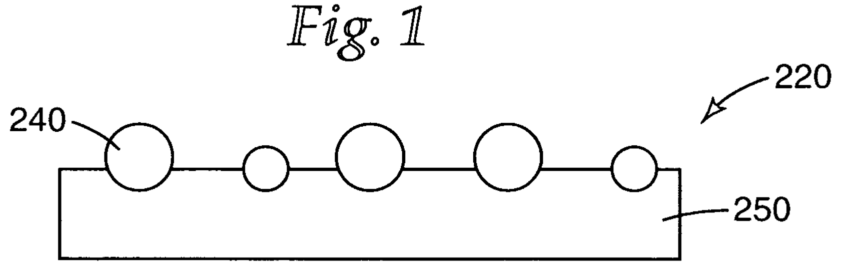
FIGS. 2(*a*) and (*b*) are schematic side views of composite materials useful in an adhesive membrane of the invention.
Figure 2B:
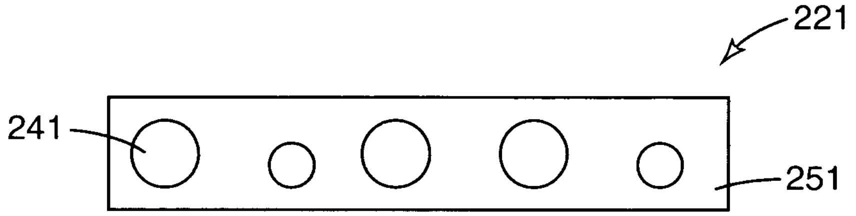

FIG. 2(*a*) shows one example of a composite material 220 that includes conductive particles 240 partially embedded in an electrically insulating layer 250. FIG. 2(*b*) shows an example of another composite material 221 that includes conductive materials 241 completely embedded in an electrically insulating layer 251. While FIGS. 2(*a*) and (*b*) serve to illustrate embodiments of a composite material useful in the present invention, any suitable arrangement where conductive particles are embedded fully or partially in any suitable ratio at any suitable position with respect to any particular surface of the elastomeric layer or material can be used. The present invention does not exclude composite materials having isolated instances where conductive particles overlap in the thickness direction of the device.

Preferably, the largest conductive particles are at least somewhat smaller than the combined thickness of the layer of electrically insulating material and the layer of PSA, at least when the particle size is measured in the thickness direction (z) of the composite. This can help prevent electrical shorting.

Suitable conductive particles include any suitable particles that have a contiguously conductive outer surface. For example, the conductive particles can be solid particles (for example, metallic spheres), solid particles coated with a conductive material, hollow particles with a conductive outer shell, or hollow particles coated with a conductive material. The conductive material can include, for example, metals, conductive metal oxides, organic conductors and conductive polymers, semiconductors, and the like. The core of coated particles can be solid or hollow glass or plastic beads, ceramic particles, carbon particles, metallic particles, and the like. The conductive particles can be transparent, semi-transparent, colored, or opaque. They can have rough or smooth surfaces, and can be rigid or deformable.

The term "particles" includes spherical beads, elongated beads, truncated fibers, irregularly shaped particles, and the like. Generally, particles include particulate objects that have aspect ratios (that is, the ratio of the narrowest dimension to the longest dimension (for example, for a fiber the aspect ratio would be length: diameter) of 1:1 to about 1:20, and have characteristic dimensions in a range of about 1 μm to about 500 μm, depending upon the application. The conductive particles are dispersed in the composite material without any preferred orientation or alignment.

Composite materials can be provided in any suitable manner. Generally, making or providing the composite material involves distributing the conductive particles and at least partially embedding the conductive particles in the electrically insulating material. For example, the particles can first be distributed on a surface and the electrically insulating material coated over, pressed onto, or laminated to the layer of particles. The surface of the particles are distributed onto can be a layer of the adhesive membrane, for example the conductors, or a carrier substrate that is removed after the particles are embedded into the electrically insulating material. As another example, the particles can be dispersed in the electrically insulating material and the resulting composite can be coated to form the composite material. As still another example, the electrically insulating material can be provided as a layer, for example by coating, and then the conductive particles can be distributed on the layer of electrically insulating material. The particles can be embedded by pressing the particles into the layer of electrically insulating material, with optional heating of the electrically insulating material to allow the elastomeric material to soften, or by distributing the particles on, and optionally pressing the particles into, the electrically insulating material layer when the electrically insulating material is in an uncured or otherwise softened state and subsequently hardening the electrically insulating material layer by curing, cooling, or the like. Thermal, moisture, and light cure reactions can be employed, as well as two part systems.

Methods of dispersing the conductive particles include, for example, those disclosed in U.S. patent application Ser. No. 03/0129302 (Chambers et al.), which is herein incorporated by reference in its entirety. Briefly, the particles can be dispensed onto a layer of the electrically insulating material in the presence of an electric field to help distribute the particles as they randomly land on the layer. The particles are electrically charged such that they are mutually repelled. Therefore, lateral electrical connections and particle agglomeration are substantially avoided. The electric field is also used to create attraction of the particles to the film. Such a method can produce a random, non-aggregating distribution of conductive particles. The particles can be applied at a preselected density with a relatively uniform (number of particle per unit area) distribution of particles. Also, the web can be buffed to further aid in the particle distribution.

Other methods of dispersing the conductive particles can also be used. For example, the particles can be deposited in the pockets of micro-replicated release liner as disclosed in International Pub. WO 00/00563, which is herein incorporated by reference in its entirety. The electrically insulating material would then be coated on or pressed against this particle-filled liner.

Any other method for distributing or dispersing the particles can be used provided that the particles are so distributed in the composite material that substantially all electrical contacts made between the conductor of the adhesive membrane and a second conductor are through one or more single particle contacts. As such, care should be taken to reduce or eliminate the occurrence of stacked particles in the composite (that is, two or more particles having overlapping positions in the thickness direction of the composite).

The methods used to place particles onto the medium should ensure that the contact between particles in the in-plane (x-y) direction is minimized. Preferably, no more than two particles should be in contact (for example, in a 30 $cm^2$ area). More preferably, no two particles are in contact with each other (for example, in a 30 $cm^2$ area). This will prevent any electrical shorting in the in-plane direction due to particle contact, and is especially preferred when the application requires multiple closely spaced electrodes.

The conductive particles can have a size distribution such that all the particles are not identical in size (or shape). In these circumstances, the larger conductive particles can make electrical contact before, or even to the exclusion of smaller neighboring particles. Whether and to what extent this occurs depends on the size and shape distribution of the particles, the presence or absence of particle agglomeration, the loading density and spatial distribution of the particles, the ability for the conductor (or conductor/substrate combination) to flex and conform to local variations, the deformability of the particles, the deformability of the material in which the particles are embedded, and the like. These and other properties can be adjusted so that a desirable number of single particle electrical contact per unit are made when sufficient pressure is applied between the adhesive membrane's conductor and a second conductor. Properties can also adjusted so that a desirable number of single particle electrical contact per unit are made when at one given amount of pressure versus a different amount of pressure applied between the adhesive membrane's conductor and a second conductor.

In some embodiments, it can be preferable for the particle size distribution to be relatively narrow, and in some circumstances it can be preferable that all the particles are substantially the same size. In some embodiments, it can be desirable to have a bimodal distribution of particle sizes. For example, it can be desirable to have two different types of particles, larger particles and smaller particles, dispersed in the composite material.

Figure 3:
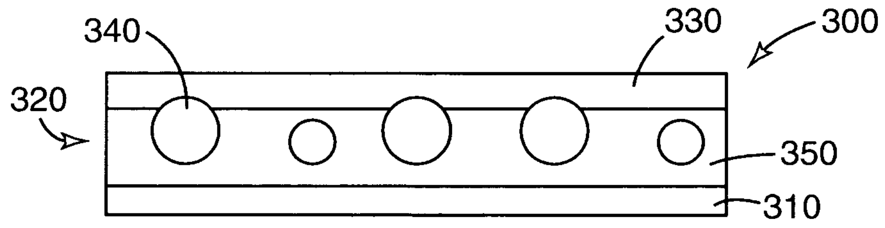
FIG. 3 is a schematic side view of an adhesive membrane of the invention.

FIG. 3 shows an embodiment of an adhesive membrane of the invention. Adhesive membrane 300 includes composite material 320 disposed on a conductor 310, and a PSA layer 330 disposed on the composite material 320. The composite material 320 comprises conductive particles 340 partially embedded in an electrically insulating layer 350. In this embodiment, the surface of the conductive particles is completely covered by the PSA layer.

Figure 4:
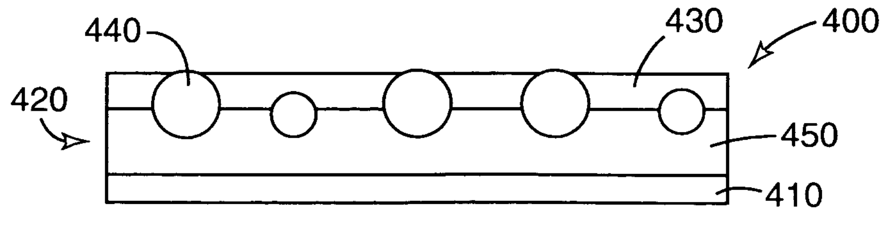
FIG. 4 is a schematic side view of another adhesive membrane of the invention.
Figure 5A:
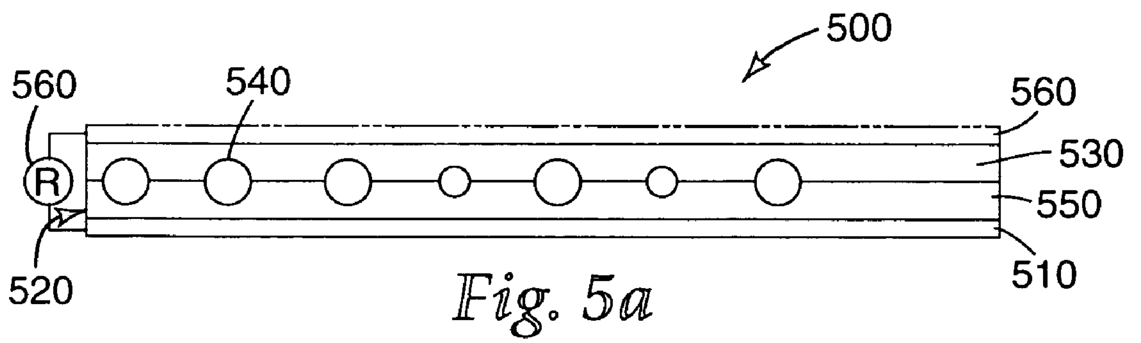
FIGS. 5(*a*), (*b*), (*c*), and (*d*) illustrate the use of an adhesive membrane of the invention as a force sensor using schematic side views of an adhesive membrane of the invention.
Figure 5B:
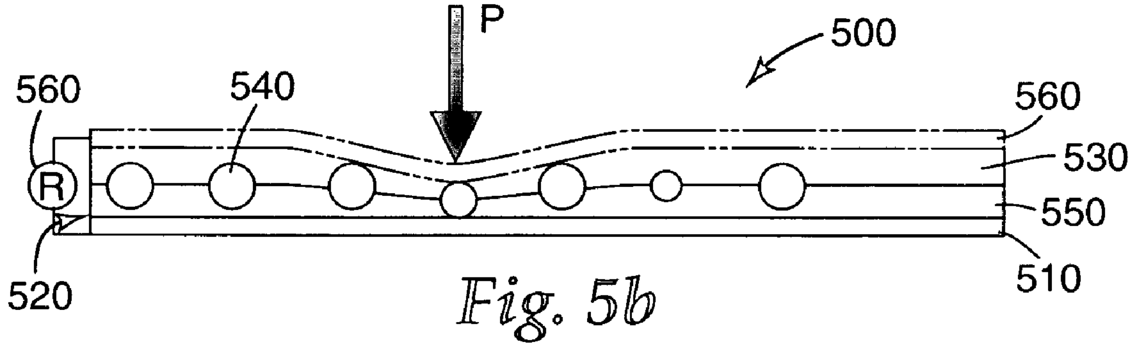
Figure 5C:
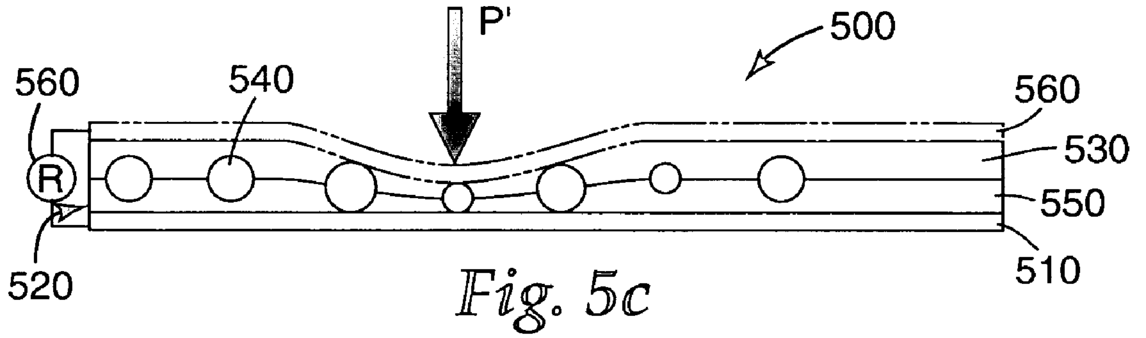
Figure 5D:
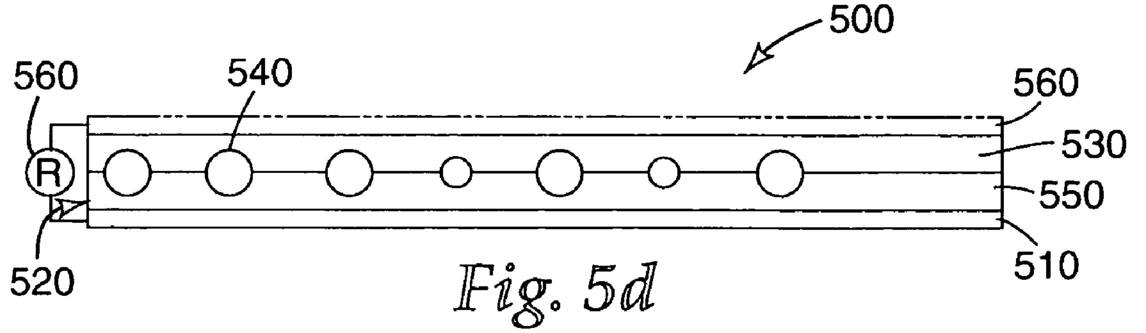

FIG. 4 shows another embodiment of an adhesive membrane of the present invention. Adhesive membrane 400 includes composite material 420 disposed on a conductor 410, and a PSA layer 430 disposed on the composite material 420. The composite material 420 comprises conductive particles 440 partially embedded in an electrically insulating layer 450. In this embodiment, a portion of the surface of some of the conductive particles is exposed through the PSA layer.

The adhesive membranes of the present invention can be adhered to a second conductor and electrically connected to a means for signaling when electrical contact is made. The second conductor can comprise any suitable conductive material (for example, metals, semiconductors, doped semiconductors, semi-metals, metal oxides, organic conductors and conductive polymers, and the like).

FIGS. 5(*a*), (*b*), (*c*), and (*d*) illustrate the use of an adhesive membrane of the invention that has been adhered to a second conductor as a force sensor. Adhesive membrane 500 includes composite material 520 disposed on a conductor 510, and a PSA layer 530 disposed on the composite material 520. The composite material 520 comprises conductive particles 540 partially embedded in an electrically insulating layer 550.

When the adhesive membrane is to be used for force sensing applications, the electrically insulating layer and the PSA layer need to be capable of returning to substantially their original dimensions on the release of pressure. As used herein, "capable of returning to substantially their original dimensions" means that the layers are capable of returning to at least 90 percent (preferably at least 95 percent; more preferably, at least 99 percent; most preferably 100 percent) of their original thicknesses within, for example, 10 seconds (preferably, within 1 second or less). Preferably, the electrically insulating layer and the PSA layer (in their fully cured states if curable materials) have a substantially constant storage modulus (G') over a large temperature range (more preferably, a substantially constant storage modulus between about 0° C. and about 100° C.; most preferably, a substantially constant storage modulus between about 0° C. and about 60° C.). As used herein, "substantially constant" means less than about 50 percent (preferably, less than 75 percent) variation. Preferably, the electrically insulating layer and the PSA layer have a G' between about $1\times10^3$ Pa/cm$^2$ and about $9\times10^5$ Pa/cm$^2$ and a loss tangent (tan delta) between about 0.01 and about 0.60 at 1 Hz at 23° C. It is also preferable that the electrically insulating layer and the PSA layer be self-healing (that is, capable of healing itself when cracked, punctured, or pierced).

Suitable materials for the electrically insulating layer and the PSA layer for use in force sensing applications include, for example, natural and synthetic rubbers (for example, styrene butadiene rubber or butyl rubber, polyisoprene, polyisobutylene, polybutadiene, polychloroprene, acrylonitrile/butadiene as well as functionalized elastomers such as carboxyl or hydroxyl modified rubbers, and the like), acrylates, silicones including but not limited to polydimethylsiloxanes, styrenic block copolymers (for example, styrene-isoprene-styrene or styrene-ethylene/butylene-styrene block copolymer), polyurethanes including but not limited to those based on aliphatic isocyanate, aromatic isocyanate and combinations thereof, polyether polyols, polyester polyols, glycol polyols, and combinations thereof. Suitable thermoplastic polyurethane polymers are available from BF Goodrich under the Estane™ name. Thermoset formulations can also be used by incorporating polyols and/or polyisocyanates with an average functionality higher than two (for example, trifunctional or tetrafunctional components). Polyureas such as those formed by reaction of a polyisocyanate with a polyamine can also be suitable. Suitable polyamines can be selected from a broad class including polyether and polyester amines such as those sold by Huntsman under the Jeffamine™ name, and polyamine functional polydimethylsiloxanes such as those disclosed in U.S. Pat. No. 6,441,118 (Sherman et al.); elastomeric polyesters such as those by DuPont under the Hytrel™ name; certain metallocene polyolefins such as metallocene polyethylene (for example, Engage™ or Affinity™ polymers from Dow Chemical, Midland Mich.) can also be suitable. Fluorinated elastomers such as Viton™ from DuPont Dow Elastomers can also be suitable. The elastomeric materials can be modified, for example, with hydrocarbon resins (for example, polyterpenes) or extending oils (for example, naphthenic oils or plasticizers), or by the addition of organic or inorganic fillers such as polystyrene particles, clays, silica, and the like. The fillers can have a particulate or fibrous morphology. Microspheres (for example, Expancel™ microspheres from Akzo Nobel) can also be dispersed in the elastomeric material.

The adhesive membrane has been adhered to a second conductor 560 and electrically connected to means for measuring variable resistance across the membrane 570. As shown in FIG. 5(*a*), when no pressure is applied between the conductors, the membrane's conductor 510 and the second conductor 560 remain electrically isolated by the electrically insulating layer 550 and the PSA layer 530.

As shown in FIG. 5(*b*), when sufficient pressure P is applied to the membrane's conductor 510, an electrical contact can be made between the membrane's conductor 510 and the second conductor 560 via single particle contacts. Single particle contacts are those electric contacts between the membrane's conductor and the second conductor where one or more single conductive particles individually contact both the membrane's conductor and the second conductor.

The deformation of the electrically insulating and PSA layers will increase or decrease as the application of pressure is increased or decreased. As shown in FIG. 5(*c*), when more pressure P' is applied to the membrane's conductor 510, the electrically insulating layer 550 and the PSA layer 530 further compress and more single particle contacts can be made.

As shown in FIG. 5(*d*), when all pressure is removed, the electrically insulating layer 550 returns to substantially its original position and no electric contacts are made.

An adhesive membrane of the present invention that has been adhered to a second conductor can be electrically connected to a means for measuring dynamic electrical response (for example, resistance, conductance, current, voltage, and the like) in order to measure the change in force or pressure across the membrane. The dynamic electrical response can be read out using any suitable means (for example, with an ohm meter, a multimeter, an array of light emitting diodes (LEDs), or audio signals with the appropriate circuitry).

An adhesive membrane of the invention that has been adhered to a second conductor can also be used in the manner described above, but wherein the second conductor moves toward the adhesive membrane's conductor.

The adhesive membranes of the invention can be provided to end users on a release liner. The end user can easily remove the adhesive membrane from the release liner and adhere it to a conductor or electrode with the application of light pressure (for example, finger pressure) or using laminators, as known in the art.

EXAMPLES

Objects and advantages of this invention are further illustrated by the following examples, but the particular materials and amounts thereof recited in these examples, as well as other conditions and details, should not be construed to unduly limit this invention.

Materials

Materials used in the example are shown in the table below. The composition of material is expressed in phr (part per hundred parts of rubber). UC Silicone is vinyl modified poly dimethyl siloxane commercially available s Y-7942 from Crompton (Greenwich, Conn.); Pt catalyst is a dispersion of platinum fine powder available from Aldrich Canada (Oakville, ON, Canada) dispersed in the UC Silicone at 1 phr concentration; DC1107 is a cross linker available from Dow Corning (Midland, Mich.); DM is dimethyl maleate, commercially available from Fischer Scientific (Ottawa, ON, Canada).

| | UC Silicone (phr) | Pt catalyst (phr) | DC1107 (phr) | DM (phr) |
|---|---|---|---|---|
| SMHV-9 | 100 | 0.33 | 0.39 | 0.26 |
| SMHV-16 | 100 | 0.33 | 0.80 | 0.60 |

Particles

Glass beads coated with indium tin oxide, commercially available as SD120 from 3M Company (St. Paul, Minn.), were used in the example as the electrically conducting particles. The beads were screened using commercially available sieves, well known in the art, to select beads in sizes less than about 50 microns.

Testing Unit

The sensor was evaluated using an apparatus called the force apparatus, which consists of a load cell (model LCFD-1 kg from Omega Engineering Inc., Hartford, Conn.) that measures the applied normal force on the sensor. The sensor to be evaluated was placed on the load cell horizontally and secured with tape. A pneumatically operated cylinder (model E9X 0.5N from Airpot Corporation, Norwalk, Conn.) connected to two valves (model EC-2-12 from Clippard Instrument Laboratory, Cincinnati, Ohio), under computer control with compressed air at about 275 kPa, was located directly above the load cell. By opening and closing the valves in a sequence, the cylinder was moved downwards in pre-determined constant steps to increase the force on the sensor which was placed on the load cell. The load cell was connected to a display device (Model DP41-S-A available form Omega Engineering Inc., Hartford, Conn.) that displayed the applied force. Once a pre-determined limit of the force was reached, the air was vented from the system using a vent valve to reduce the force on the sensor.

The conductors of the sensor were connected to a multimeter to record the sensor's electrical response. The resistance of the sensor was measured using a digital multimeter (Keithley Model 197A microvolt DMM from Keithley Inc., Cleveland, Ohio). The applied force as read from the load cell and the electrical response of the sensor as read from the multimeter were captured with a PC based data acquisition system. The force applied ranged from 0.1 to 10 newton, and the application of force was done at a rate of about 0.028 newton/s (1.67 newton/min).

Explanation of n-Value

When the resistance across a force sensor is measured, the response of resistance versus force can be plotted in a log-log plot. In a certain range, the power law relation can be given by the formula: resistance=$A/F^n$, where A is a constant, F is force, and n (the "n-value") is the slope of the best-fit line (determined by linear regression) on log-log plot. The n-value indicates the sensitivity of the sensor. The higher the n-value, the larger the change in resistance of the sensor for a given change in applied force. A lower n-value means a smaller change in resistance for the same change in applied force.

Explanation of $R^2$

As described above, the response of resistance versus force can be plotted in a log-log plot, and the best-fit line can be determined. As is known in the art, the degree of fit (or measure of goodness of fit) of the linear regression can be indicated by an $R^2$ value. $R^2$ is a fraction between 0.0 and 1.0. The closer $R^2$ is to 1.0, the better the fit. When $R^2$ is 1.0, all plotted points lie exactly in a straight line with no scatter.

Example 1

SMHV 16 was coated 50 micron thick on a 175 micron thick conductive ITO coated polyester film using a knife coater. Then, the ITO coated glass beads described above were dispersed on the coated sample as described in U.S. patent application Ser. No. 03/0129302 (Chambers et al.) using a particle dispense rate of 2.5 g/min. The coating speed was set to 0.076 m/s. The resulting sample was cured at 120° C. in air for 1 minute in an oven. Then SMHV-9 ("PSA layer") was knife coated at a thickness of 25 micron on top of the cured sample and calendared using a liner under a rubber roll. Then the sample was placed in the oven at 120° C. for a few minutes for the final cure.

After cure, the liner was removed. The top PSA layer was tacky to the touch. The resulting structure was then hand laminated onto a second conductive ITO coated polyester layer to form a force sensor. By connecting the two conducting ITO layers to the digital multimeter, with two wires with alligator clips, the electrical response of the sensor was measured as a function of applied force using the force apparatus described above. When the response of resistance versus force was plotted in a log-log plot, there were two regions on the plot that were fitted with two separate straight lines. The data (shown in Table 1) indicates that the device can be used as a force sensor in relatively low force (0.7-1.4 Newton) ranges and relatively high force (1.4-7.5 Newton) ranges.

TABLE 1

| Range of Force (Newton) | n | $R^2$ |
|---|---|---|
| 0.7-1.4 | 0.66 | 0.971 |
| 1.4-7.5 | 0.13 | 0.968 |

The referenced descriptions contained in the patents, patent documents, and publications cited herein are incorporated by reference in their entirety as if each were individually incorporated.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. An adhesive membrane comprising:

(a) a conductor;

(b) a composite material comprising conductive particles at least partially embedded in an electrically insulating layer disposed on the conductor; and (c) a pressure sensitive adhesive layer disposed on the composite material, the conductive particles being capable of electrically connecting the conductor to a second conductor under application of sufficient pressure therebetween, the conductive particles having no relative orientation and being disposed so that substantially all electrical connections made between the conductor and a second conductor will be in the z direction, the combined thickness of the electrically insulating layer and the pressure sensitive adhesive layer being greater than the size of the largest conductive particle when the largest conductive particle is measured in the z direction, and the electrically insulating layer and the pressure sensitive adhesive layer comprising an elastomeric material that has a substantially constant G' between about 0° C. and about 100° C. and being capable of returning to substantially their original dimensions on the release of pressure, wherein the adhesive membrane, when combined with a second conductor or electrode, is capable of forming a customized force sensor.

2. The adhesive membrane of claim 1 wherein the conductive particles are disposed so that substantially all electrical connections made between the first and second conductors are through single particles.

3. The adhesive membrane of claim 2 wherein the conductive particles are disposed so that no more than two particles are in contact with each other.

4. The adhesive membrane of claim 3 wherein no two particles are in contact with each other.

5. The adhesive membrane of claim 1 wherein the conductive particles comprise a metal.

6. The adhesive membrane of claim 1 wherein the conductive particles comprise core particles having a conductive coating.

7. The adhesive membrane of claim 6 wherein the core particles comprise glass particles.

8. The adhesive membrane of claim 6 wherein the core particles comprise hollow particles.

9. The adhesive membrane of claim 6 wherein the conductive coating comprises metal.

10. The adhesive membrane of claim 6 wherein the conductive coating comprises a conductive oxide.

11. The adhesive membrane of claim 1 wherein the conductive particles are substantially spherical.

12. The adhesive membrane of claim 1 wherein the conductive particles are fibers.

13. The adhesive membrane of claim 1 wherein at least a portion of the surface of one or more conductive particles is exposed through the electrically insulating layer and the pressure sensitive adhesive layer.

14. The adhesive membrane of claim 1 wherein the electrically insulating layer comprises an elastomeric material that has a substantially constant G' between about 0° C. and about 60° C.

15. The adhesive membrane of claim 1 wherein the pressure sensitive adhesive layer has a substantially constant G' between about 0° C. and about 60° C.

16. The adhesive membrane of claim 1 wherein the electrically insulating layer comprises an elastomeric material that has a G' between about $1\times10^3$ Pa/cm$^2$ and about $9\times10^5$ Pa/cm$^2$ and a loss tangent between about 0.01 and about 0.60 at 1 Hz at 23° C.

17. The adhesive membrane of claim 1 wherein the pressure sensitive adhesive layer has a G' between about $1\times10^3$ Pa/cm$^2$ and about 9×10% Pa/cm$^2$ and a loss tangent between about 0.01 and about 0.60 at 1 Hz at 23° C.

18. The adhesive membrane of claim 1 wherein the electrically insulating layer comprises an elastomeric material that is self-healing.

19. The adhesive membrane of claim 1 wherein the pressure sensitive adhesive layer is self-healing.

20. The adhesive membrane of claim 1 further comprising a device capable of measuring dynamic electrical response across the membrane.

21. The adhesive membrane of claim 1 further comprising a second conductor adhesively bonded to the pressure sensitive adhesive layer opposite the composite material.

22. An adhesive membrane comprising:

(a) a conductor;

(b) a composite material comprising conductive particles at least partially embedded in an electrically insulating layer disposed on the conductor;

(c) a pressure sensitive adhesive layer disposed on the composite material; and (d) a release liner on an outer surface of the pressure sensitive adhesive layer;

the conductive particles being capable of electrically connecting the conductor to a second conductor under application of sufficient pressure therebetween, the combined thickness of the electrically insulating layer and the pressure sensitive adhesive layer being greater than the size of the largest conductive particle when the largest conductive particle is measured in the z direction, the electrically insulating layer and the pressure sensitive adhesive layer comprising an elastomeric material that has a substantially constant G' between about 0° C. and about 100° C. and being capable of returning to substantially their original dimensions on the release of pressure, and wherein the adhesive membrane, when combined with a second conductor or electrode, is capable of forming a customized force sensor.

23. An adhesive membrane comprising:

(a) a conductor that is permeable to moisture vapor;

(b) a composite material comprising conductive particles at least partially embedded in an electrically insulating layer disposed on the conductor, said electrically insulating layer being permeable to moisture vapor; and (c) a pressure sensitive adhesive layer disposed on the composite material;

the conductive particles being capable of electrically connecting the conductor to a second conductor under application of sufficient pressure therebetween, the combined thickness of the electrically insulating layer and the pressure sensitive adhesive layer being greater than the size of the largest conductive particle when the largest conductive particle is measured in the z direction, and the electrically insulating layer and the pressure sensitive adhesive layer comprising an elastomeric material that has a substantially constant G' between about 0° C. and about 100° C. and being capable of returning to substantially their original dimensions on the release of pressure, wherein the adhesive membrane, when combined with a second conductor or electrode, is capable of forming a customized force sensor.

* * * * *

UNITED STATES PATENT AND TRADEMARK OFFICE

CERTIFICATE OF CORRECTION

PATENT NO. : 7,468,199 B2
APPLICATION NO. : 11/021913
DATED : December 23, 2008
INVENTOR(S) : Ranjith Divigalpitiya It is certified that error appears in the above-identified patent and that said Letters Patent is hereby corrected as shown below:

<u>Column 12</u>

Line 6; Claim 17, delete “9x10% Pa/$cm^{2}$” and insert -- $9x10^{5}$ Pa/$cm^{2}$ --, therefor.

Signed and Sealed this

Sixth Day of April, 2010

David J. Kappos
*Director of the United States Patent and Trademark Office*